United States Patent [19]

Turner, Jr.

[11] Patent Number: 5,112,097

[45] Date of Patent: May 12, 1992

[54] TRUCK TRAILER COVER

[76] Inventor: Frederick Turner, Jr., R. 2, Harrisburg, Ill. 62946

[21] Appl. No.: 692,702

[22] Filed: Apr. 29, 1991

[51] Int. Cl.⁵ .............................................. B60P 7/04
[52] U.S. Cl. .................................................. 296/100
[58] Field of Search ................................ 296/100, 98

[56] References Cited

U.S. PATENT DOCUMENTS

| | | | |
|---|---|---|---|
| 2,757,042 | 7/1956 | Schultz | 296/100 |
| 2,807,499 | 9/1957 | Duddleston | 296/100 |
| 3,041,104 | 6/1962 | Richard | 296/100 |
| 4,215,897 | 8/1980 | Aiken et al. | 296/100 |
| 4,858,984 | 8/1989 | Weaver | 296/100 |

Primary Examiner—Robert R. Song
Attorney, Agent, or Firm—Warren D. Flackbert

[57] ABSTRACT

A covering arrangement for the cargo area of a truck defined by trolley assemblies positioning overlying covering fabric in a sealing relationship with the cargo area. The trolley assemblies, each typically driven by a chain, are propelled forwardly and rearwardly in an uncovering and covering relationship. The rear portion of the cargo area is covered by a fixed and/or independent fabric which includes a laterally extending cushioned bar. Another cushioned bar, locataed at the rearmost end of the movable covering fabric, selectively engages the other cushioned bar to present an effective sealed relationship. Resilient means secured to the trolley assemblies continually urge the covering fabric into a sealed relationship with the top edges of the side walls.

6 Claims, 2 Drawing Sheets

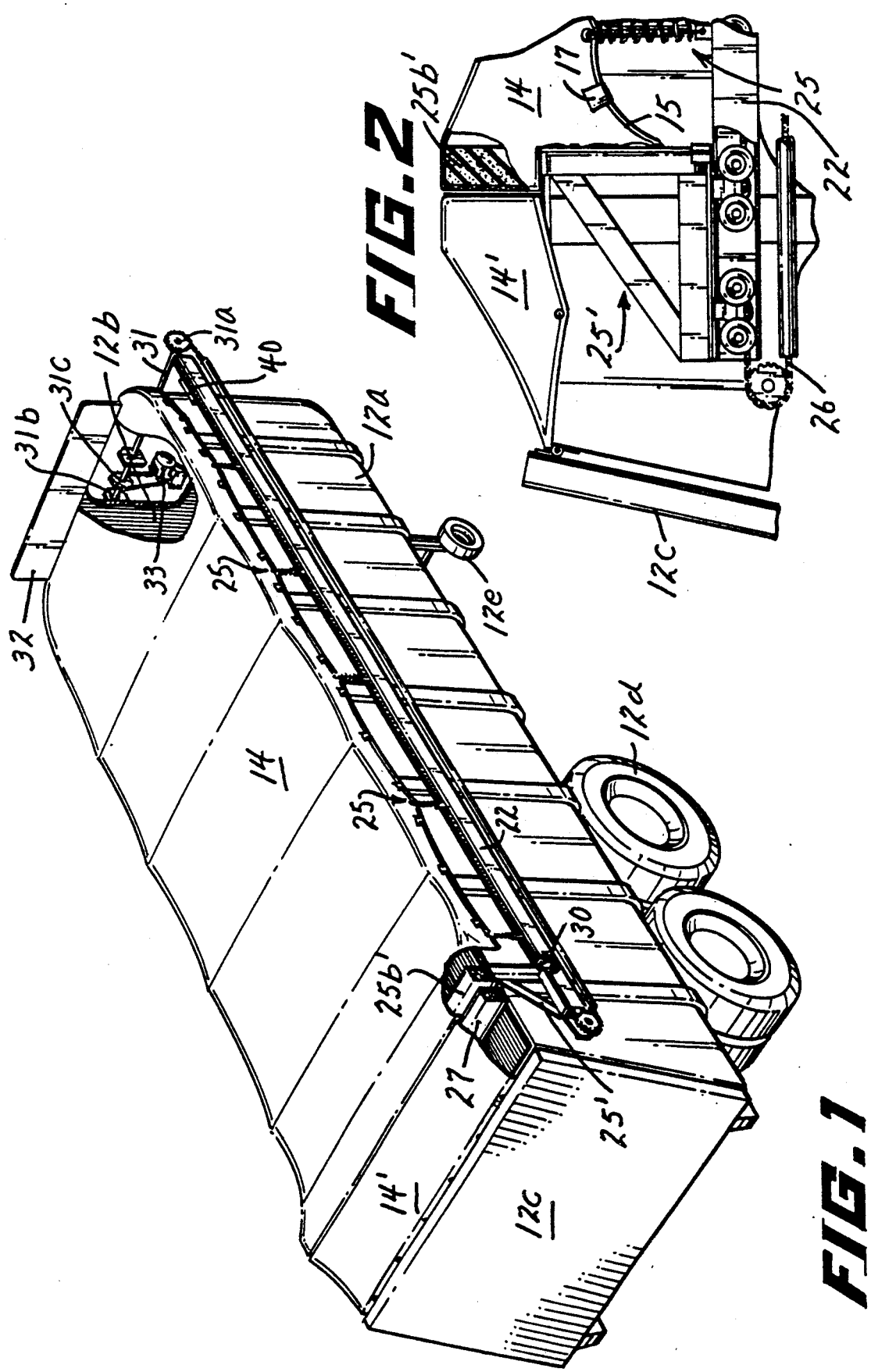

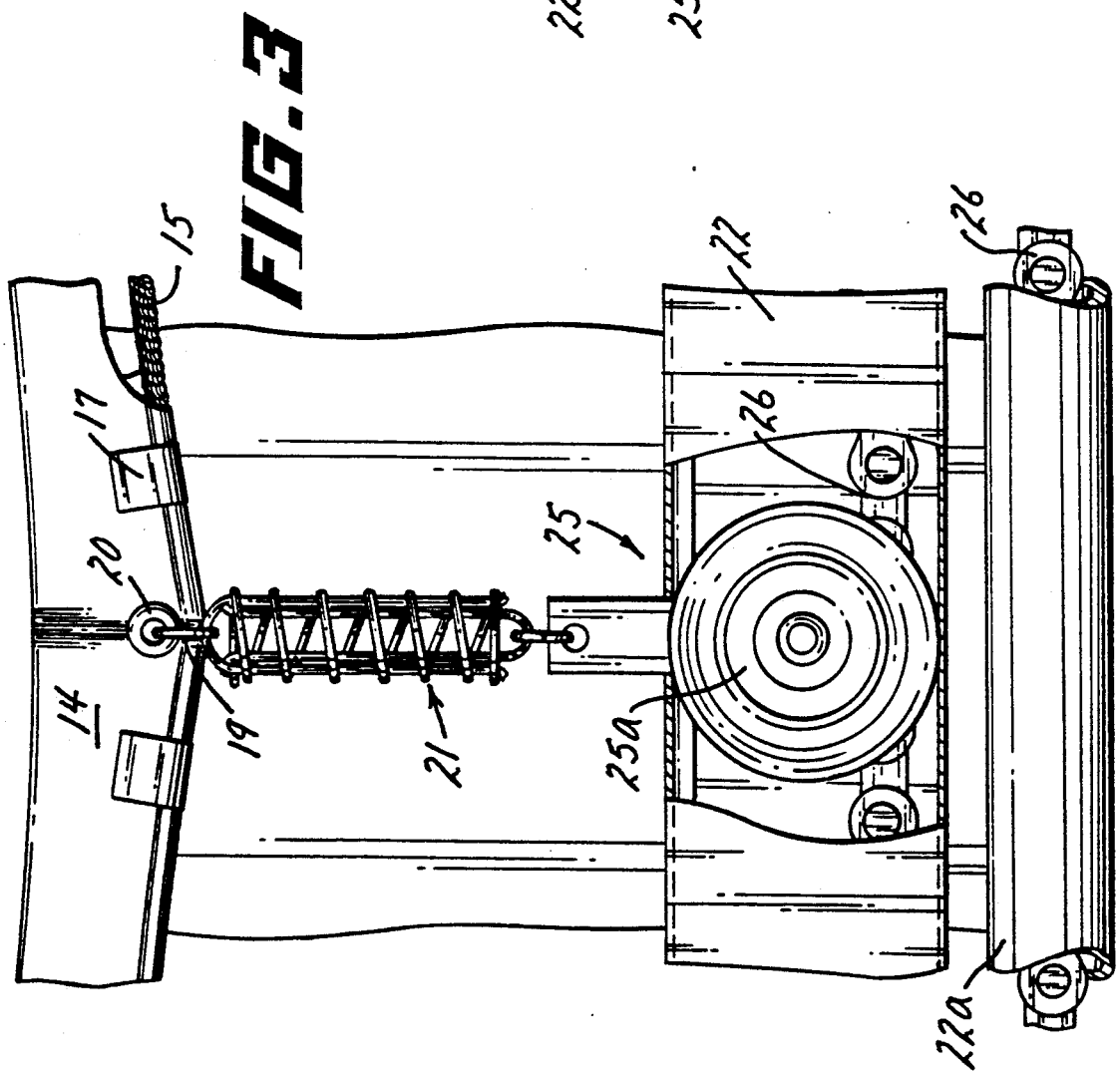

TRUCK TRAILER COVER

BACKGROUND OF THE INVENTION

As is known, a usage of tractor-trailer combinations to carry grain, for example, is quite widespread and ever growing. A problem exists, however, in satisfactorily covering the grain for transit, since state and local government rules generally dictate and must be satisfied in instances of this type.

DESCRIPTION OF THE INVENTION

The invention presents a truck trailer cover in the form of a tarpaulin, selectively movable from a contents or cargo covering to an uncovering relationship, and conversely. In a preferred embodiment, each outer side wall of the truck trailer mounts a rail along which trolley assemblies travel. A top portion of each trolley assembly connects, through a resilient arrangement, to the edge of the tarpaulin, where the latter is reinforced by a cable maintained in position by a series of snaps.

Switching is provided to either discontinue tarpaulin movement after a full covering or a full uncovered position is attained, and a control switch initiates the desired operation.

A shield, disposed at the forward end of the truck trailer, serves to prevent tarpaulin from falling from the trailer. A cushioned rear bar, positioned on the rearmost trolley assemblies, serves to seal the tarpaulin against a stationary or fixed cushioned bar when the tarpaulin is fully closed. The rear space on the trailer, i.e. between the rear entry and the fixed cushioned bar, is typically and independently covered by a separate tarpaulin, further assuring positive total covering.

DESCRIPTION OF THE FIGURES

In any event, a better understanding of the present invention will become more apparent from the following description, taken in conjunction with the accompanying drawings, wherein FIG. 1 is a perspective view of a truck trailer cover in accordance with the teachings of the invention and at an installed position;

FIG. 2 is a fragmentary view, partly in vertical section, detailing the rearmost position of the cover;

FIG. 3 is a front plan view showing the trolley arrangement for transporting the cover to a covering and uncovering position, and conversely; and, FIG. 4 is a detailed view of the trolley arrangement of FIG. 3, looking from left to right or from right to left in such figure.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

DESCRIPTION OF THE PREFERRED EMBODIMENTS

Referring now to the figures, the truck trailer cover of the invention is used in connection with various types of open bed trailers, one of which is illustrated herein. The latter presents a flat load or cargo receiving surface (not shown) defining the bed, upstanding side walls 12a, a front wall 12b and a hinged (not detailed as to such) lid or rear wall/entry 12c which permits contents or cargo dumping. Conventionally, the trailer is mounted by wheels 12d and includes an auxiliary support 12e.

A cover 14, such as a tarpaulin, overlies the cargo and/or contents receiving area of the bed and, preferably, includes a wire cable 15 along the edges thereof, maintained in position by snaps 17. The cable 15 serves strength purposes in the closing of the tarpaulin 14, i.e. eliminates excess forces on the tarpaulin 14 itself.

As further evident in FIG. 3, an "S" hook 19 extends through each of a series of grommets 20 disposed along the edges of the tarpaulin 14. Each "S" hook 19 serves to retain a spring arrangement 21, such typically being in a form commonly used on a storm door.

As evident in FIG. 1, a rail 22 extends the length of the trailer, along both side walls 12a, such being typically flange mounted (also see FIG. 4). A trolley assembly 25 is provided at 36" intervals, for example, along the tarpaulin 14, as evident in FIG. 1. Each of the trolley assemblies 25 is mounted on wheels 25a driven by a continuous chain 26. A chain return in the form of a hollow conduit 22a is mounted on the undersurface of each of the rails 22.

Looking again at FIGS. 1 and 2, and particularly at the hinged lid or rear wall 12b of the trailer, a stationary cushioned bar 27 extends from side-to-side of the trailer, spaced apart from the rear wall 12b of the trailer, being supported by the top edges of the side walls 12a. As apparent in each of the referenced figures, tarpaulin 14' overlies both the cushioned bar 27 and the space terminating at the hinged lid or rear entry 12b.

The rearmost trolley assemblies 25' each define a support for mounting a laterally extending cushioned bar 25b' which is overlaid by tarpaulin 14. As trolley assemblies 25 move rearwardly, and are stopped at the end of the run by a trip switch 30, cushioned bar 25b' engages cushioned bar 27 and achieves a positive seal precluding unwanted passage of cargo or contents during transit.

Operation of the chain 26 is achieved by sprockets 31a disposed at opposite ends of a rod 31 mounted on brackets 31b disposed on the outer side of the front wall 12b. A support mounted drive 33 operates a chain engaging a sprocket 31c on rod 31.

Overall operation is controlled by a conventional rocker switch (not shown), which may be located near the driver in the truck cab. Once depressed, the switch remains at such position until a break in the circuitry. Restated otherwise, when the switch is at a closed position, the switch remains at such closed position until the circuit is broken as, for example, by trolley assemblies 25' contact with the aforesaid shutoff switch 30. The rocker switch is then pressed into an open position, reversing the motor and causing movement of the trolley assemblies 25 from the rear of the trailer to the forward end of the trailer, where the forward or uncovering movement is halted by another shutoff switch 40.

From the preceding, it should be evident that the truck trailer cover presented by the invention serves effective sealing, i.e. prevents any unwanted blowing of contents or cargo during transit. The cover (tarpaulin) is positively secured in position, being fitted at the front of the trailer, and with the use of selectively abutting cushioned bars 25b'-27, positive sealing is accomplished. Shield 32 serves further cover control purposes. The provision of the separate tarpaulin/cover at the rear end of the trailer solves a problem and/or trouble area created by arrangements in use heretofore. In other words, any gap or tarpaulin void in the rear portion of the trailer is eliminated.

The truck trailer cover described herein is susceptible to various changes within the spirit of the invention, including, by way of example, in proportioning; the driving of the trolley assemblies; the manner of securing the tarpaulin to the trolley assemblies; the configuration of a trolley assembly per se; the fabrication of the cover from other than tarpaulin, as moisture impervious nylon sheeting; and, the like. Thus, the preceding description should be considered illustrative and not as limiting the scope of the following claims:

I claim:

1. A covering arrangement for the cargo area of a truck defined by a front wall, side walls, and a rear entry comprising rails fixedly secured to the outer surfaces of said side walls, trolley assemblies movable along said rails, a covering fabric overlying said cargo area, where said trolley assemblies are secured to edges of said covering fabric, where said trolley assemblies continually urge said covering fabric into a sealing relationship, and means selectively moving said trolley assemblies in a forward and a rearward direction on said rails, where a portion of said cargo area spaced from said rear entry includes a lateral cushioned bar overlaid by separate covering fabric, and where the rearmost of said trolley assemblies mounts a lateral cushioned bar overlaid by said covering fabric and selectively engaging said lateral cushioned bar spaced from said rear entry in a sealing relationship.

2. The covering arrangement of claim 1 where resilient means selectively secured to said trolley assemblies continually urge said covering fabric into a sealing relationship.

3. The covering arrangement of claim 1 where electrical circuitry in the form of switches stop movement of said trolley assemblies in both a forward and a rearward direction.

4. The covering arrangement of claim 1 where said trolley assemblies moving means is a continuous chain.

5. The covering arrangement of claim 1 where said covering fabric is contoured in a sealing relationship with said front wall and said side walls.

6. The covering arrangement of claim 1 where said covering fabric is tarpaulin.

* * * * *